(12) United States Patent
Watanabe

(10) Patent No.: US 7,320,290 B2
(45) Date of Patent: Jan. 22, 2008

(54) STEERING COLUMN BRACKET

(75) Inventor: Daisuke Watanabe, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 11/636,840

(22) Filed: Dec. 11, 2006

(65) Prior Publication Data

US 2007/0175375 A1 Aug. 2, 2007

(30) Foreign Application Priority Data

Jan. 27, 2006 (JP) .............................. 2006-018577

(51) Int. Cl.
*B63H 25/04* (2006.01)

(52) U.S. Cl. .................. 114/144 R; 280/779

(58) Field of Classification Search ............ 114/144 R, 114/364; 280/775, 777, 779, 780; 440/53
See application file for complete search history.

(56) References Cited

U.S. PATENT DOCUMENTS

| | | | |
|---|---|---|---|
| 4,531,921 A | * | 7/1985 | Teraura et al. .......... 114/144 R |
| 5,934,733 A | * | 8/1999 | Manwaring ................ 280/779 |
| 2005/0093285 A1 | | 5/2005 | Lee et al. |
| 2005/0275207 A1 | | 12/2005 | Park |
| 2006/0043722 A1 | * | 3/2006 | Hoshino et al. ............ 280/777 |

FOREIGN PATENT DOCUMENTS

| | | |
|---|---|---|
| JP | 2000-62649 | 2/2000 |
| JP | 2002-193109 | 7/2002 |
| JP | 2004-256082 | 9/2004 |

* cited by examiner

*Primary Examiner*—Lars A. Olson
(74) *Attorney, Agent, or Firm*—William L. Androlia; H. Henry Koda

(57) ABSTRACT

The present invention provides a steering column bracket 1 including a receiving main body 12 put to the deck cross member 2 from below and a sling plate 11 straddling the deck cross member 2 from above to be spanned over the receiving main body 2. The receiving main body 12 is formed into a sectionally groove shape by integrally coupling respective lower edges of a symmetric pair of abutting plate portions 122, 122 and a mounting plate portion 121. The mounting plate portion 121 provides a mounting portion for the steering column. Each abutting plate portion 122 is formed in a shape of twin peaks that comprises a notch edge 1221 located between the twin peaks and shaped along a sectional shape of the deck cross member 2, a front inclined edge 1222, a rear inclined edge 1224 aligning with tangents L,L to the deck cross member 2.

6 Claims, 7 Drawing Sheets

– 1 –
STEERING COLUMN BRACKET

TECHNICAL FIELD

The present invention relates to a steering column bracket for supporting a steering column on a deck cross member (also called an instrument panel cross member, a steering support, or a cross car beam) to function as a mounting base portion for the steering column.

In this invention, an anteroposterior direction and a right-left direction on the deck cross member and the steering column bracket are respectively defined as an anteroposterior direction and a width direction of a vehicle.

BACKGROUND OF THE INVENTION

A steering column bracket is secured to a deck cross member spanned across a vehicle body frame in a width direction at front of a driver's seat to function as a mounting base portion for supporting the steering column on the deck cross member. In Japanese Patent Application Laid-open No. 2000-062649, a support member 5a and a support member 5b corresponding to the steering column bracket are in shapes of rail pieces having groove-like sectional shapes where semicircular notches are formed in upper edges and are fitted over a lower half of a circumstance of the support member 3 and welded to a support member 3 corresponding to the deck cross member. A steering column SC disclosed in Japanese Patent Application Laid-open No. 2000-062649 is disposed while inclined rearward at an intermediate position between the support members 5a, 5b and is supported by fixing opposite ends of a stay 51 covering the steering column SC to bottom faces of both the support members through bolts.

In Japanese Patent Application Laid-open No. 2002-193109, a steering column support member 9 corresponding to the steering column bracket extends in an anteroposterior direction of a vehicle from a steering support member 10 corresponding to the deck cross member and is formed of an upper panel 11 and a lower panel 12 disposed at upper and lower positions with the deck cross member interposed between them. The upper panel 11 and the lower panel 12 are provided with arc-shaped portions 11a and 12a respectively positioned at intermediate positions in the anteroposterior direction and curved to be axisymmetric. The steering column support member 9 is mounted by sandwiching the deck cross member between both the arc-shaped portions 11a and 12a.

Besides, there is a support member 20 having an opening portion 21 and corresponding to the steering column bracket of the invention as disclosed in Japanese Patent Application Laid-open No. 2004-256082. The opening portion 21 of the steering column bracket in Japanese Patent Application Laid-open No. 2004-256082 has a shape equal to an outside shape of a reinforcement 10 corresponding to the deck cross member, e.g., a circular hollow sectional shape. This steering column bracket is formed by extrusion molding of a light alloy such as an aluminum alloy, for example.

SUMMARY OF THE INVENTION

High rigidity is required of the steering column bracket and the deck cross member for the purpose of increasing a resonance frequency of a steering wheel so as to prevent the steering wheel mounted to an upper end of the steering column from vibrating in a vertical direction raised by vibration of the vehicle body. This resonance appears as torsional vibration mainly because the vibration of the vehicle body causes the steering column to vibrate in the vertical direction and a load (hereafter referred to as "vertical load") raised by vertical vibration of the steering column is transmitted to the deck cross member via the steering column bracket to generate a torsional load on the deck cross member. If coupling rigidity of the steering column bracket and the deck cross member is insufficient, deformation between the steering column bracket and the deck cross member further encourages the torsional vibration. Therefore, the steering column bracket requires to be coupled to the deck cross member with high rigidity. In the steering column bracket, accordingly, a function of effectively transmitting the vertical load applied to the steering column bracket to the deck cross member as the torsional load is required. In order to realize the function, it is preferable that a welding area where the steering column bracket is coupled to the deck cross member covers a broader area.

In that point, the steering column brackets disclosed in Japanese Patent Application Laid-open No. 2000-062649 are formed by simply bending plates into substantially inverted-hat groove shapes in section and therefore are welded only to the lower half of the circumference of the deck cross member. Consequently, the steering column brackets disclosed in Japanese Patent Application Laid-open No. 2000-062649 are not considered to be able to sufficiently satisfy the rigidity requirements. On the other hand, the steering column bracket disclosed in Japanese Patent Application Laid-open No. 2002-193109 has an advantage of higher rigidity over the Japanese Patent Application Laid-open No. 2000-062649 because of the structure in which the deck cross member is vertically sandwiched between the upper panel and the lower panel both having complicated sectional shapes.

However, the steering column bracket in Japanese Patent Application Laid-open No. 2002-193109 has a single-member structure in which the right and left bracket units are integrated with each other and therefore it is difficult to form broad welding area on an intermediate portion of the bracket units to the deck cross member. As a result, it is impossible to secure a weld length sufficient to the whole steering column bracket. Consequently, the steering column bracket in Japanese Patent Application Laid-open No. 2002-193109 is not considered to be able to sufficiently transmit the load from the steering column to the deck cross member. Moreover, the complicated sectional shape of the steering column bracket employed by Japanese Patent Application Laid-open No. 2002-193109 so as to enhance rigidity requires to become press-formed products having two deep-drawn shapes close to each other as the upper and lower members. This results in drawbacks of more difficult manufacturing of the upper lower members and higher cost of manufacturing.

From only a view point of rigidity, in case of the steering column bracket disclosed in Japanese Patent Application Laid-open No. 2004-256082 press-fitted over and fixed to the deck cross member, it would appear that the load applied to the steering column bracket is transmitted to the deck cross member through a broad area. However, the steering column bracket disclosed in Japanese Patent Application Laid-open No. 2004-256082 is obtained by extrusion molding of the light alloy such as the aluminum alloy, and accordingly, it is controversial that cost of manufacturing becomes expensive.

Therefore, the inventor of the present invention examines the structure of a steering column bracket that can meet requirements of not only rigidity and function but also, as the automotive members, reduction in weight and lower manufacturing cost.

As a result of the examination, the inventor develops a steering column bracket comprising a receiving main body put to the deck cross member from below, a sling plate straddling the deck cross member from above to be spanned over the receiving main body, the receiving main body is formed into sectionally groove shape by integrally coupling respective lower edges of a symmetric pair of abutting plate portions and corresponding opposite ends of a mounting plate portion, the mounting plate portion provides a mounting portion for the steering column, each of the abutting plate portions is formed in a shape of twin peaks that comprises a notch edge located between the twin peaks and shaped along a sectional shape of the deck cross member, a front inclined edge and a rear inclined edge aligning with tangents to the deck cross member, both the notch edges are put and welded to the deck cross member from below, the sling plate has an intermediate part face brought in contact with the deck cross member from above, and a front part face and a rear part face protruding from the deck cross member to align with the tangents to the deck cross member, the front inclined edges and the rear inclined edges of both the abutting plate portions of the receiving main body aligning with the tangents to the deck cross member being respectively brought in contact with the front part face and the rear part face from below, side edges of the intermediate part face of the sling plate are welded to the deck cross member, and the front inclined edges and the rear inclined edges of the receiving main body are respectively welded to the front part face and the rear part face of the sling plate. Here, the term "weld length" described in this invention means a length over which welding can be carried out. A pattern of the welding is not restricted. The welding may be carried out on the weld length continuously or intermittently.

In the steering column bracket of the present invention, a combination of the receiving main body and the sling plate forms into one bracket unit. It may adopt a one-member structure in which only one bracket unit comprising a pair of right and left mounting portions for the steering column provided to the mounting plate portion of the receiving main body is mounted to the deck cross member. The one-member structure is advantageous from a viewpoint of reduction in the number of parts. However, in the present invention, it is preferable that the steering column bracket is a two-member structure each defined by the receiving main body and the sling plate as a bracket unit comprising the mounting portion formed on the mounting plate portion of the receiving main body for supporting either side of the steering column, and arranging in pairs to the deck cross member. In this two-member structure, a weld length of the notch edges welding the receiving main body to the deck cross member is increased as compared with the one-member structure. As a result, it is possible to enhance rigidity of the steering column bracket required and further to obtain a function of transmitting the vertical load effectively from the steering column to the deck cross member throughout a broad area.

In the steering column bracket of the invention, rigidity is enhanced as follows. First, in the steering column bracket of the invention, the receiving main body put to the deck cross member from below is slung by the sling plate straddling the deck cross member from above. Therefore, a length of an edge portion of the member in contact with the deck cross member is increased so that the weld length to the deck cross member is increased. Further, in the steering column bracket of the invention, the receiving member having sectionally groove shape is closed with the sling plate and the deck cross member to form its closed section and to thereby enhance rigidity of the bracket. In this case, the receiving main body, the sling plate and the deck cross member are welded to each other, so that the vertical load applied from the steering column is transmitted to the deck cross member throughout the broad area. Furthermore, a shorter width of the mounting plate portion which is the bottom face of the receiving main body having groove shape diminishes distances from the mounting portion, such as the holes for bolts or nuts, to the abutting plate portions. In other words, the width of the receiving main body can be shortened till a length substantially equal to an outer diameter of the nut or the head of bolt. This realizes to enhance rigidity of the mounting plate portion. As a result, furthermore, the groove shape of the receiving main body may become flared upwardly in that the abutting plate portions that form both side faces of the receiving main body are extending while broadening.

Here, the front inclined edges and the rear inclined edges of the receiving main body are formed to align with tangents to the deck cross member. The front part face and the rear part face of the sling plate brought the respective inclined edges in contact therewith are extending respectively along directions of the tangents to the deck cross member. As a result, the vertical load applied to the receiving main body only pulls the front part face and the rear part face of the sling plate along their extending directions and to thereby reliably transmit the vertical load to the deck cross member without deforming the flat-plate-shaped sling plate. Restricting directions of pulling the deck cross member by the sling plate as in the directions of the aforementioned tangents, it is advantageous to suppress plate-deformation of the deck cross member and to thereby maintain rigidity of the deck cross member higher. The receiving main body and the sling plate are joined to each other by welding such as fillet welding, for example, not joined by conventionally using flanges, while bringing the front inclined edges and the rear inclined edges of the receiving main body in contact with the front part face and the rear part face of the sling plate from below. This causes an advantage that problems such as rigidity lowered by deformation of the flanges can be avoided.

The receiving main body may be formed with a reinforcing portion bulging or recessed in a direction orthogonal to the abutting plate portion. In this case, it is preferable that the reinforcing portion reaches the notch edge and that the notch edge is molded in the shape of curvature in a plan view. Such a reinforcing portion enhances rigidity of the abutting plate portion of the receiving body most susceptible to deformation under the vertical load applied, for example, and to thereby enhance rigidity of the whole steering column bracket. In addition, the receiving main body may be formed with at least one recessed portion partially at a bent edge molded between the abutting plate portion and the mounting plate portion. The recessed portion also has a function of retaining shapes of the bent edges so as to maintain bending relationships between the abutting plate portions and the mounting plate portion. Thus, by providing the reinforcing portion and the recessed portion to the receiving main body, the receiving main body of the present invention is no longer the simple member having the sectionally groove shape and can realize its high rigidity while keeping a simple structure.

As described above, the steering column bracket of the invention transmits the vertical load applied from the steering column to the receiving main body as the torsional load to the deck cross member through the broad area in such a manner as to pull the front part face and the rear part face of the sling plate in their extending directions. The torsional load is transmitted to the deck cross member without changing where sufficient rigidity of the steering column bracket integrated the sling plate and the receiving main body as shown in the present invention is displayed. In order to enhance the rigidity of the steering column bracket, therefore, it may be adopted that each of the abutting plate portions is formed with a front end edge intersecting the front inclined edge and extending from an end of the front inclined edge down toward the mounting plate portion, that the front part face of the sling plate is partially bent toward the front end edges, and that the front end edges are brought in contact with and welded to the front part face partially bent. Likewise, it may be adopted that each of the abutting plate portions is formed with a rear end edge intersecting the rear inclined edge and extending from an end of the rear inclined edge down toward the mounting plate portion, that the rear part face of the sling plate is partially bent toward the rear end edges, and that the rear end edges are brought in contact with and welded to the rear part face partially bent.

Regardless of such a simple structure of the receiving main body and the sling plate, the steering column bracket of the invention has high rigidity against deformation and the function of reliably transmitting the torsional load applied from the steering column to the deck cross member. Much of the credit for the high rigidity and the function of transmitting the torsional load goes to the closed section structure formed of the receiving main body and the sling plate. Moreover, it is possible to secure a long weld length of the receiving main body and the sling plate to the deck cross member and a long weld length of the receiving main body and the sling plate to each other. This sets welding position properly even if the partial welding is employed, for example. At the same time, this provides effects of the high rigidity and the function of transmitting the load. As a result, a wall thickness of the deck cross member can be reduced and to thereby obtain a secondary effect of weight reduction of the deck cross member. Furthermore, since the steering column bracket of the invention has the simple structure formed of the receiving main body and the sling plate, it is able to reduce in weight of the member easily and to manufacture the product at low cost.

DETAILED DESCRIPTION OF THE INVENTION

The embodiments of the present invention will be described below with reference to the drawings.

Figure 1:
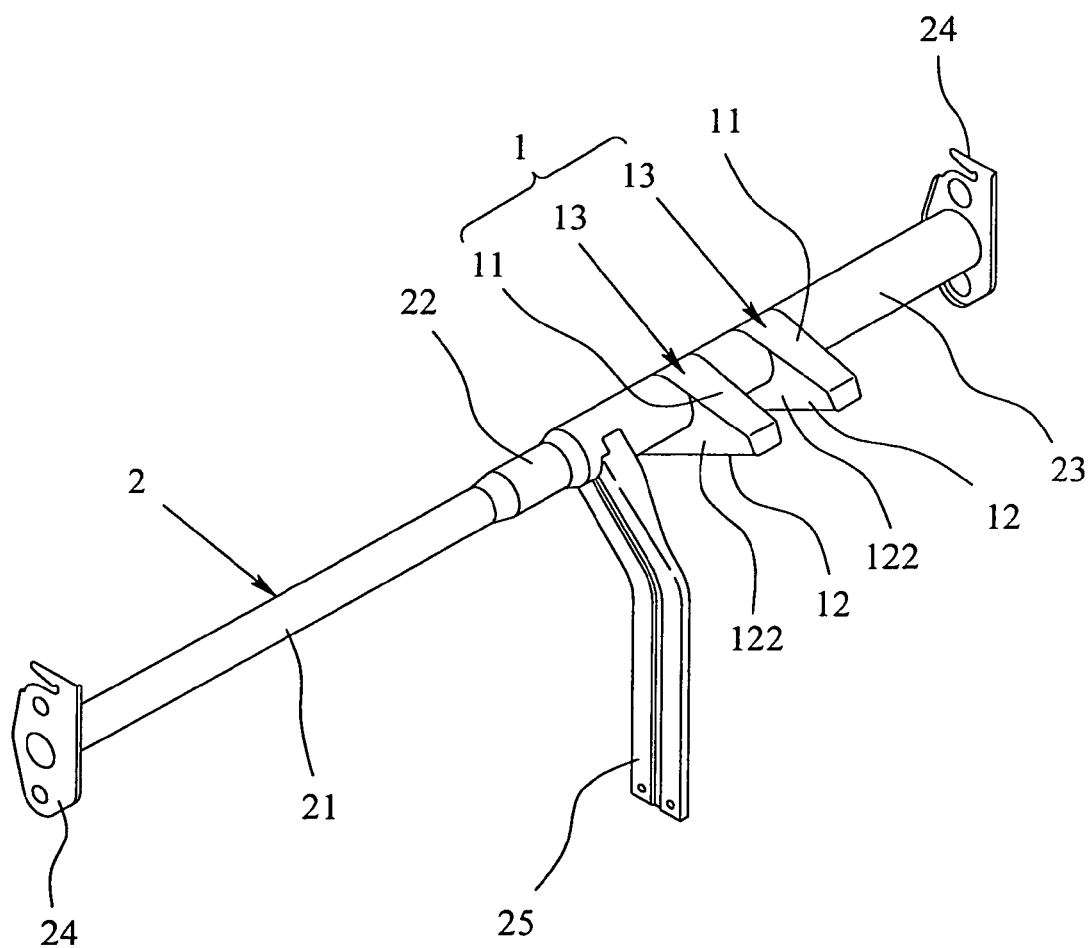
FIG. 1 is a perspective view of a deck cross member to which a steering column bracket is mounted as viewed from the left upper rear side of a vehicle.

A deck cross member 2 of this embodiment is formed of a metal pipe having a circular hollow section as shown in FIG. 1. The deck cross member 2 comprises a small-diameter pipe portion 21 formed on a left half of the deck cross member 2, a middle-diameter pipe portion 22 and a large-diameter pipe portion 23 formed in order on a right half of the deck cross member 2. A steering column bracket 1 is mounted to the large-diameter pipe portion 23. The deck cross member 2 further comprises a pair of support brackets 24, 24 fixed by welding to the opposite ends of the deck cross member 2 to be connected to the side frames (not illustrated) of the vehicle body, and a reinforcing support column 25 (or a brace 25) fixed by welding to the position roughly in the center of the deck cross member 2, i.e., the left end of the large-diameter pipe portion 23, to be connected to the floor frame (not illustrated) of the vehicle body. The reinforcing support column 25 is an auxiliary member for ensuring positional stability of the deck cross member 2, and functions to increase a resonance frequency of the deck cross member 2 by forming a fixed point on the deck cross member 2.

As shown in FIGS. 2 to 6, the steering column bracket 1 of this embodiment has a two-member structure that a pair of bracket units 13, 13 each defined by a receiving main body 12 put to the deck cross member 2 from below and a sling plate 11 straddling the deck cross member 2 from above and spanned over the receiving main body 12 are arranged to be mounted to the deck cross member 2. Each of the bracket units 13 has the same structure in which two bolt holes 1211 are formed on a mounting plate portion 121 of the receiving main body 12 as a mounting portion for a steering column (not illustrated). A pair of the bracket units 13 of the single specification are mounted to the large-diameter pipe portion 23 of the deck cross member 2 in parallel. Therefore, the steering column bracket 1 of the embodiment can adapt to the steering columns of different specifications by merely adjusting a distance between the respective bracket units 13. Moreover, the receiving main body 12 of this embodiment in which notch edges 1221, 1221 having an arc shape are putting to the deck cross member 2 gives that an inclined angle of the steering column can be easily adjusted by shifting the position putting the notch edge 1221 to the deck cross member 2.

The receiving main body 12 as a component of the bracket unit 13 is a member having a structure that is formed into a sectionally groove shape by integrally coupling respective lower edges of a symmetric pair of abutting plate portions 122, 122 and corresponding opposite ends of the mounting plate portion 121. In the light of enhancing rigidity of the mounting plate portion 121 for fixing the steering column, the receiving main body 12 of this embodiment comprises the mounting plate portion 121 set its width narrower and the abutting plate portions 122, 122 standing in the shape of gradually widened upwardly. See FIGS. 5 and 6. In this way, it is spread an area over which a portion mounting to the deck cross member 2 is distributed so that a vertical load transmitted from the steering column can be dispersed over a wider range, and to thereby improve rigidity of the deck cross member 2. Moreover, it makes the receiving main body 12 formed by press-molding to be demolded easily and to thereby increase productivity. The mounting plate portion 121 includes two bolt holes 1211, 1211, which are mounting portions for the steering column, placed in a lengthwise direction. The width of the mounting plate portion 121 is restricted enough to such a width that a nut (not illustrated) to be secured into the bolt hole 1211 can come in contact with a face of the mounting plate portion 121. Thus, by reducing distances from the bolt holes 1211 to the opposite abutting plate portions 122, 122, the rigidity of the mounting plate portion 121 is enhanced. Since the mounting portion may only have a structure or constitution in that the steering column can be mounted, the various conventional structures or constitutions of the mounting portion can also be employed.

Figure 4:
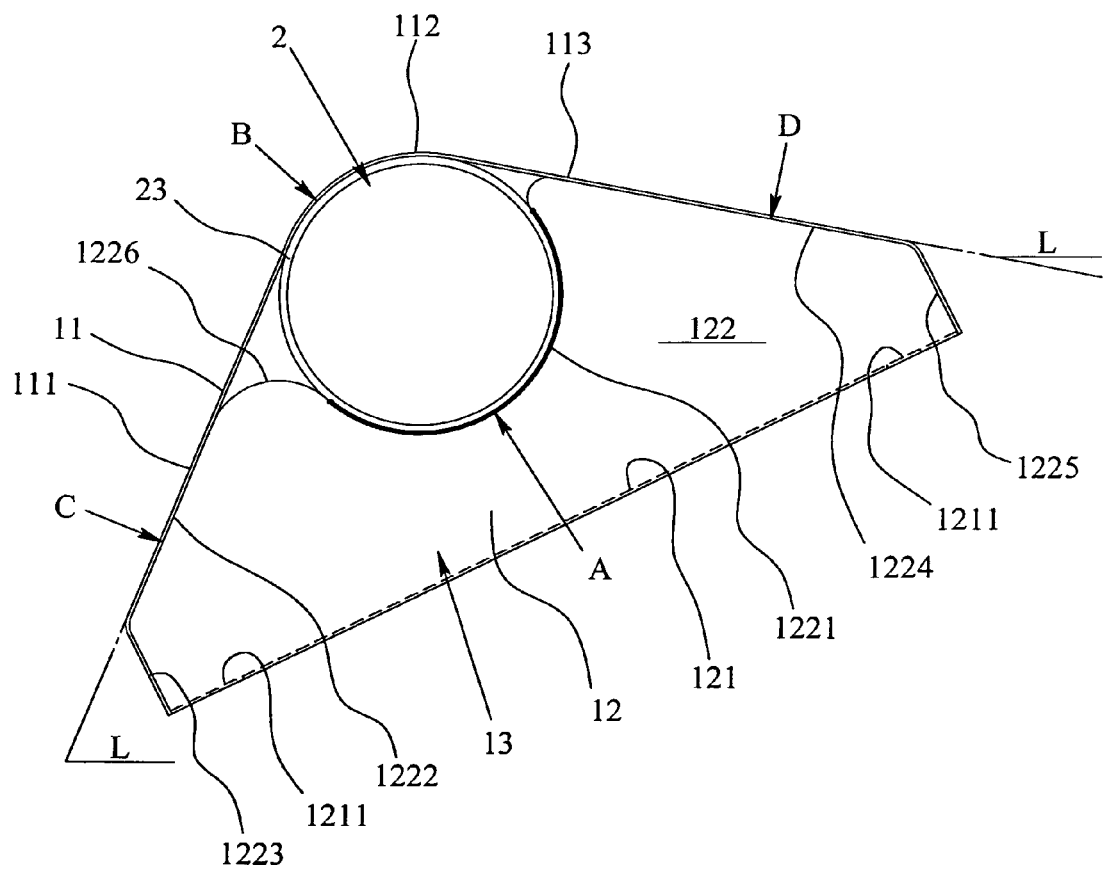
FIG. 4 is a side view of the steering column bracket.
Figure 5:
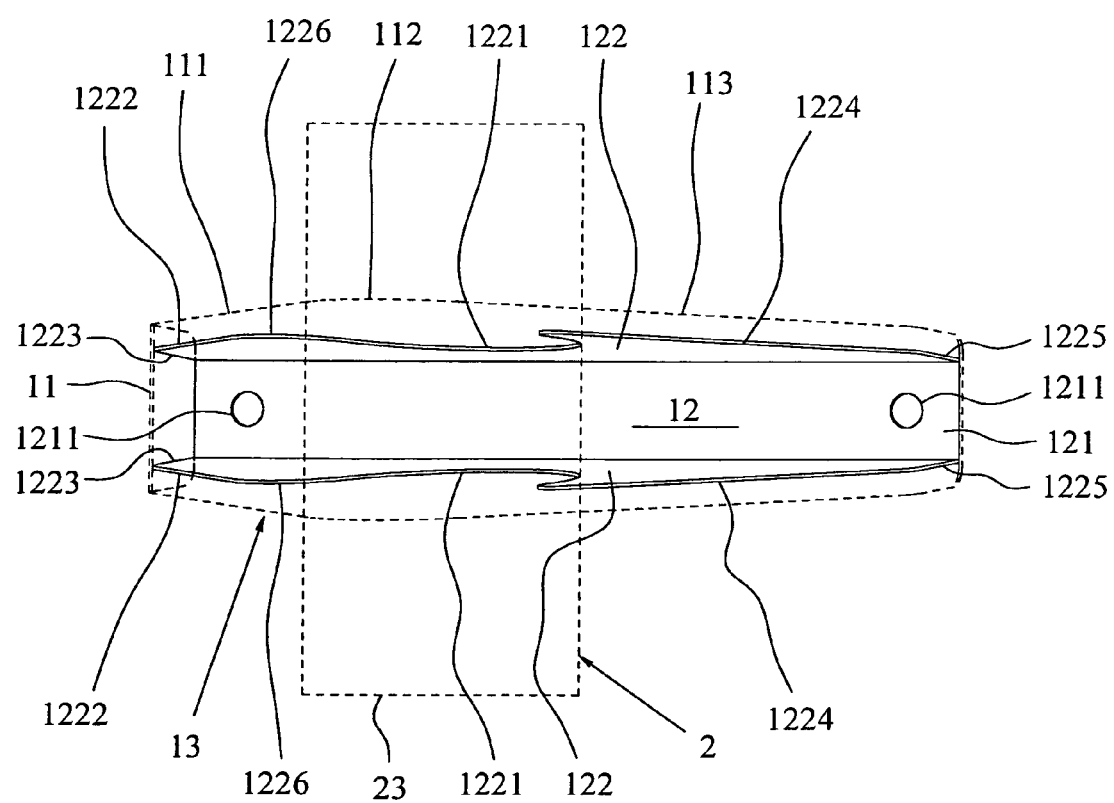
FIG. 5 is a plan view of the steering column bracket with the deck cross member and a sling plate of which are illustrated in phantom lines.
Figure 6:
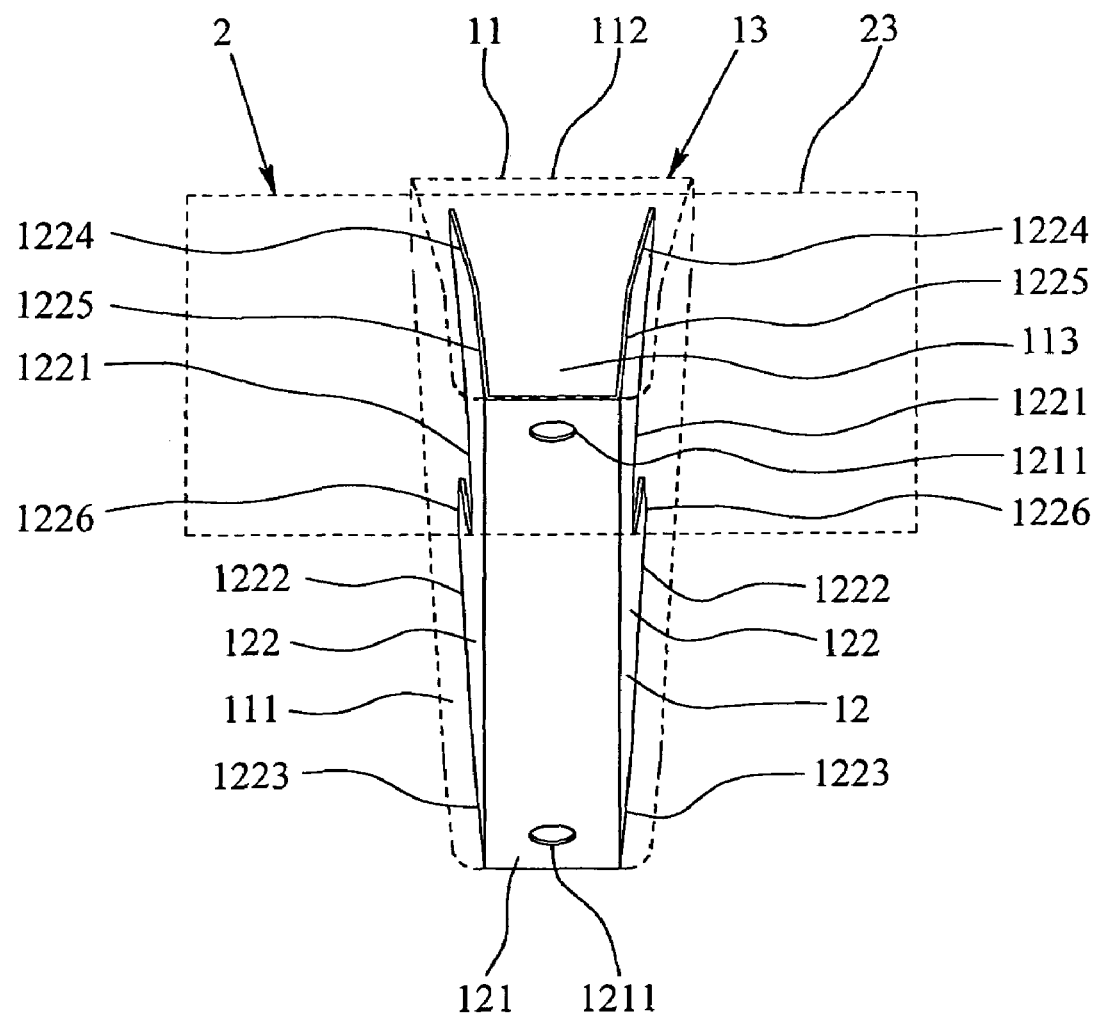
FIG. 6 is a back view of the steering column bracket with the deck cross member and the sling plate of which are illustrated in phantom lines.

Each of the abutting plate portions 122 has an upper edge formed of a notch edge 1221, a front inclined edge 1222, a front end edge 1223, a rear inclined edge 1224, and a rear end edge 1225. The notch edge 1221 has a semicircular shape along a sectional shape of the deck cross member 2 and is positioned at a substantially intermediate position in an anteroposterior direction of the abutting plate portion 122. The front inclined edge 1222 is formed to align with a tangent L extending forward and downward from the deck cross member 2, as shown in FIG. 4. In this embodiment, a side face open edge 1226 is formed by cutting off a corner portion formed on the corner of the declivitous tangent L extending forward from the deck cross member 2 and the notch edge 1221. The front inclined edge 1222 is formed to extend forward from the point at the intersection of the side face open edge 1226 and the declivitous tangent L. The front end edge 1223 is formed to further extend from the front inclined edge 1222 at right angles to the mounting plate portion 121 in such a manner that a corner portion formed on the corner of the declivitous tangent L extending forward from the deck cross member 2 and the mounting plate portion 121 is cut off. The rear inclined edge 1224 is formed to align with a tangent L extending rearward and downward from the deck cross member 2. The rear end edge 1225 is formed to extend from the rear inclined edge 1224 at right angles to the mounting plate portion 121 in such a manner that a corner portion formed on the corner of the declivitous tangent L extending rearward from the deck cross member 2 and the mounting plate portion 121 is cut off.

The receiving main body 12 comprises the opposite notch edges 1221 of the respective symmetric abutting plate portions 122 put to the deck cross member 2 from below and welded the portions in contact with a surface of the deck cross member 2. See a thick line pointed by an arrow A in FIG. 4. At this time, the longer the portions in contact with the surface of the deck cross member 2, the longer the weld length, i.e., a length of the thick line pointed by the arrow A, can be obtained and, as a result, the receiving main body 12 can be firmly secured to the deck cross member 2. However, in terms of an assembly procedure in which the receiving main body 12 is put to the deck cross member 2 from below, each of the notch edges 1221 to the deck cross member 2 having the circular section are required to have an smaller angle than that of a semicircle, as shown in the embodiment. Therefore, in the abutting plate portions 122 of the embodiment, in order to make it easier to put the notch edges 1221 to the deck cross member 2 while obtaining the maximum weld length, each of the notch edges 1221 is formed into a semicircle having the maximum angle, the side face open edge 1226 is formed in front of the notch edge 1221, and the corner portion formed at the corner of the notch edge 1221 and the rear inclined edge 1224 is rounded off.

The sling plate 11 is a member formed of one metal plate and comprises a front part face 111, an intermediate part face 112, and a rear part face 113 in view of a relationship with the receiving main body 12 and the deck cross member 2. The intermediate part face 112 is a portion to be in contact with the face of the deck cross member 2 from above. Side edges of the intermediate part face 112 are welded to the surface of the deck cross member 2. See a portion pointed by an arrow B in FIG. 4. The front part face 111 and the rear part face 113 are to be portions protruding forward and rearward when the intermediate part face 112 is brought in contact with the face of the deck cross member 2. The front inclined edges 1222 and the rear inclined edges 1224 of the opposite abutting plate portions 122 of the receiving main body 12 are respectively brought in contact with these front part face 111 and rear part face 113 from below, an end part of the front part face 111 are partially bent toward and brought in contact with the front end edges 1223, 1223 of the receiving main body 12, an end part of the rear part face 113 are partially bent toward and brought in contact with the rear end edges 1225, 1225, and thereby to weld them respectively. See portions pointed by arrows C and D in FIG. 4. In this embodiment, as described above, the abutting plate portions 122, 122 of the receiving main body 12 are standing in the shape of gradually widened upwardly. Therefore, the sling plate 11 in this embodiment has a shape in a plan view that the intermediate part face 112 positioned at the farthest from the mounting plate portion 121 of the receiving main body 12 has the broadest width and that the widths of the front part face 111 and rear part face 113 are symmetrically gradually narrowed as it closes in on the mounting plate portion 121.

In the bracket unit 13 of this embodiment, at first, the side edges of the intermediate part face 112 of the sling plate 11 and the notch edges 1221, 1221 of the receiving main body 12 are respectively welded to the deck cross member 2. See portions pointed by the arrows A and B in FIG. 4. The weld length of the respective welding areas is as long as a halfway around a circumference of the deck cross member 2 or longer (a little less than 70% in this example) to thereby enhance rigidity of the bracket units 13, 13 respectively to the deck cross member 2. The sling plate 11 and the receiving main body 12 are welded while putting the front end edges 1223, 1223, the front inclined edges 1222, 1222, the rear inclined edges 1224, 1224, and the rear end edges 1225, 1225 of the abutting plate portions 122, 122 of the receiving main body 12 to the sling plate 11. See the portions pointed by the arrows C and D in FIG. 4. This makes the sling plate 11 and the receiving main body 12 into a secured and integrated member, and it can form the structure having a closed section throughout a longitudinal direction, i.e., an anteroposterior direction of the mounting plate portion 121. As a result, the rigidity of the bracket unit 13 against the torsional load of the steering column transmitted through the mounting plate portion 121 can be enhanced, and further the bracket unit 13 is able to better transmit the torsional load to the deck cross member 2.

The sling plate 11 is formed of one metal plate as described already. The front part face 111 and the rear part face 113 of the sling plate 11 extend in the directions of the tangents to the deck cross member 2 along the front inclined edge 1222 and the rear inclined edge 1224 of the receiving main body 12. Thus, the load transmitted from the receiving main body 12 is restricted to directions in which the front part face 111 and the rear part face 113 are pulled in their extending directions, and accordingly the load is reliably transmitted to the deck cross member 2 without deformation occurred on the sling plate 11. To restrict the directions of the load transmitted from the receiving main body 12 to the sling plate 11 in this manner brings advantages that surface deformation of the deck cross member 2 is suppressed and thereby prevented reduction in rigidity of the deck cross member 2. Moreover, since the upper edges of the abutting plate portions 122 of the receiving main body 12 are brought in contact with and welded to the front part face 111 and the rear part face 113 of the sling plate 11 from below, it can be avoided from the problems caused by deformation of flanges, such as reduction in rigidity. As described above, the steering column bracket 1 of the present invention is characterized in aspects how the sling plate 11 is utilized.

Figure 2:
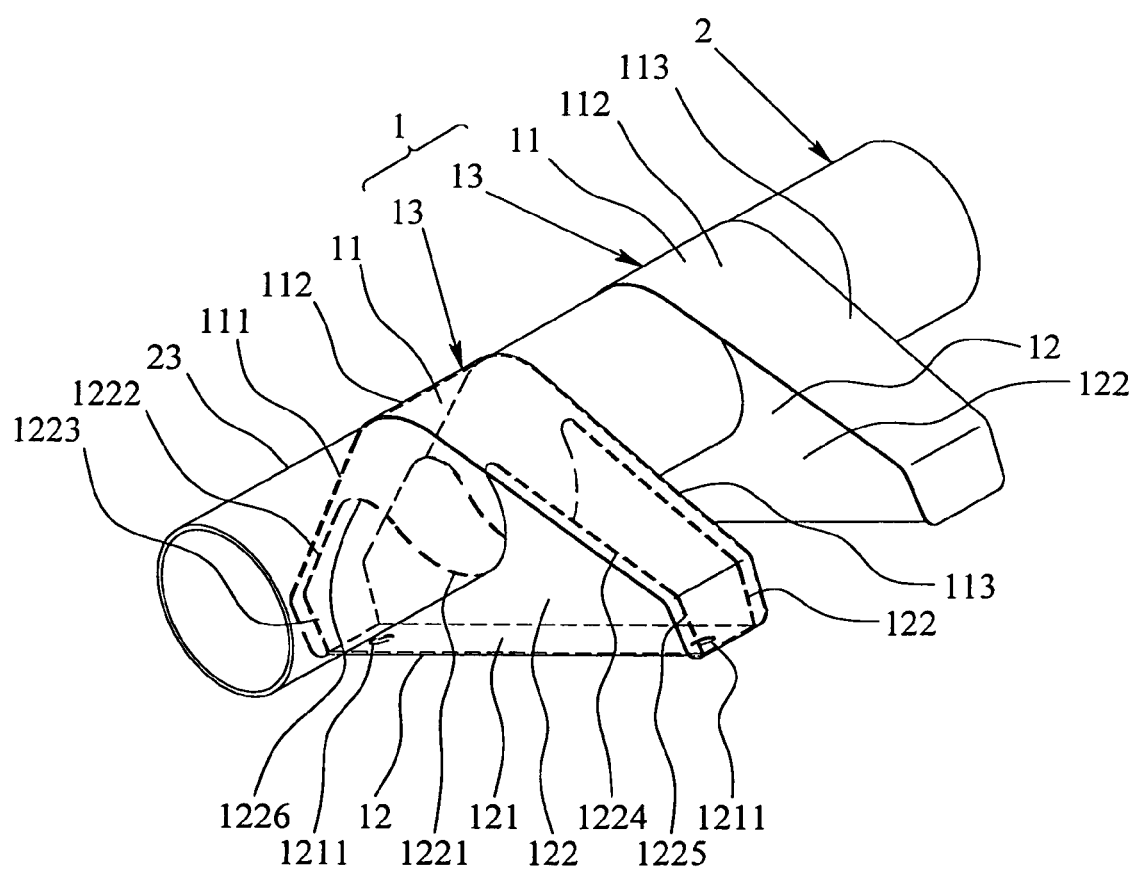
FIG. 2 is a partially enlarged perspective view of the steering column bracket mounted to the deck cross member.
Figure 3:
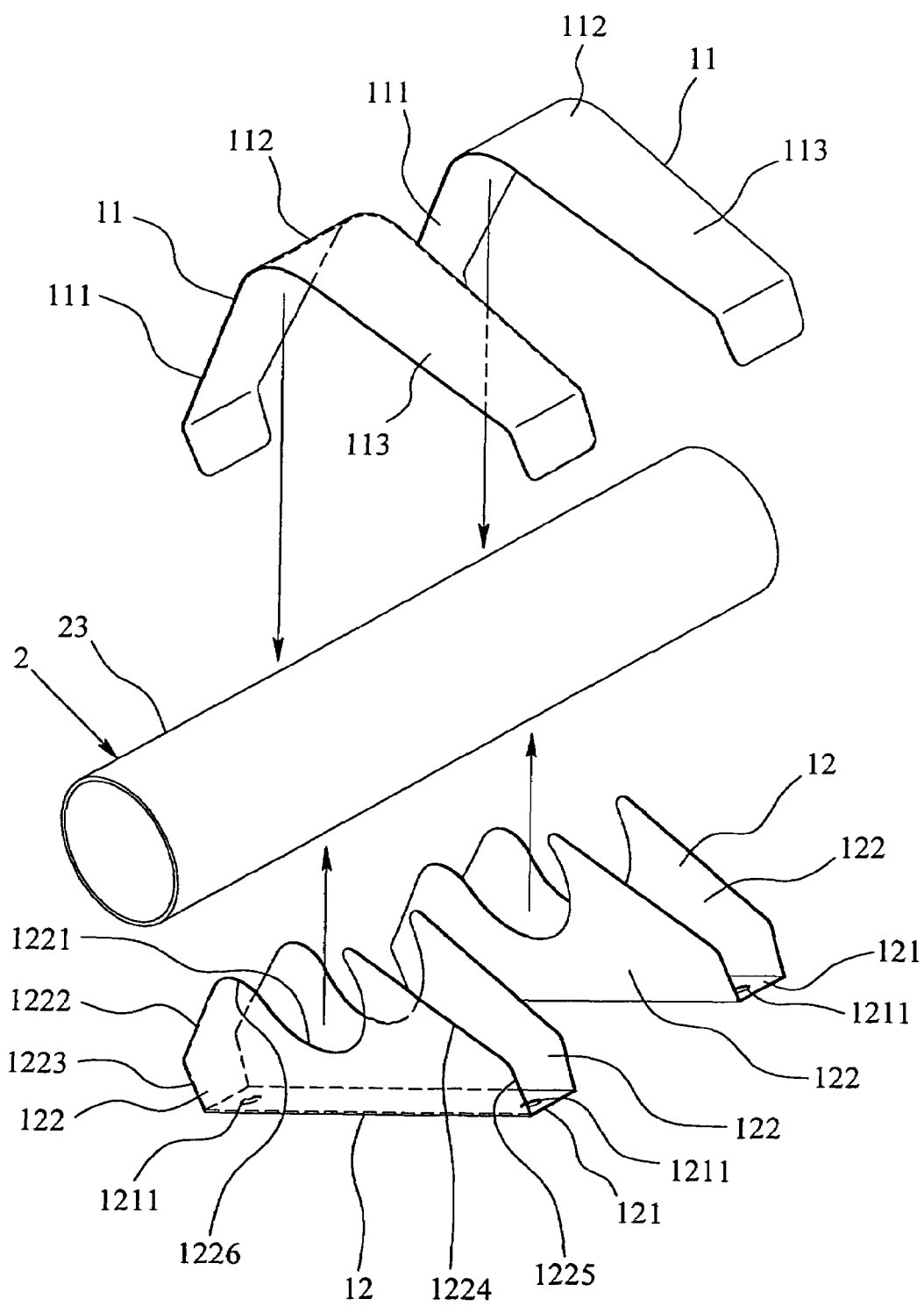
FIG. 3 is a perspective view corresponding to FIG. 2, showing the mounting relation of the steering column bracket to the deck cross member.
Figure 7:
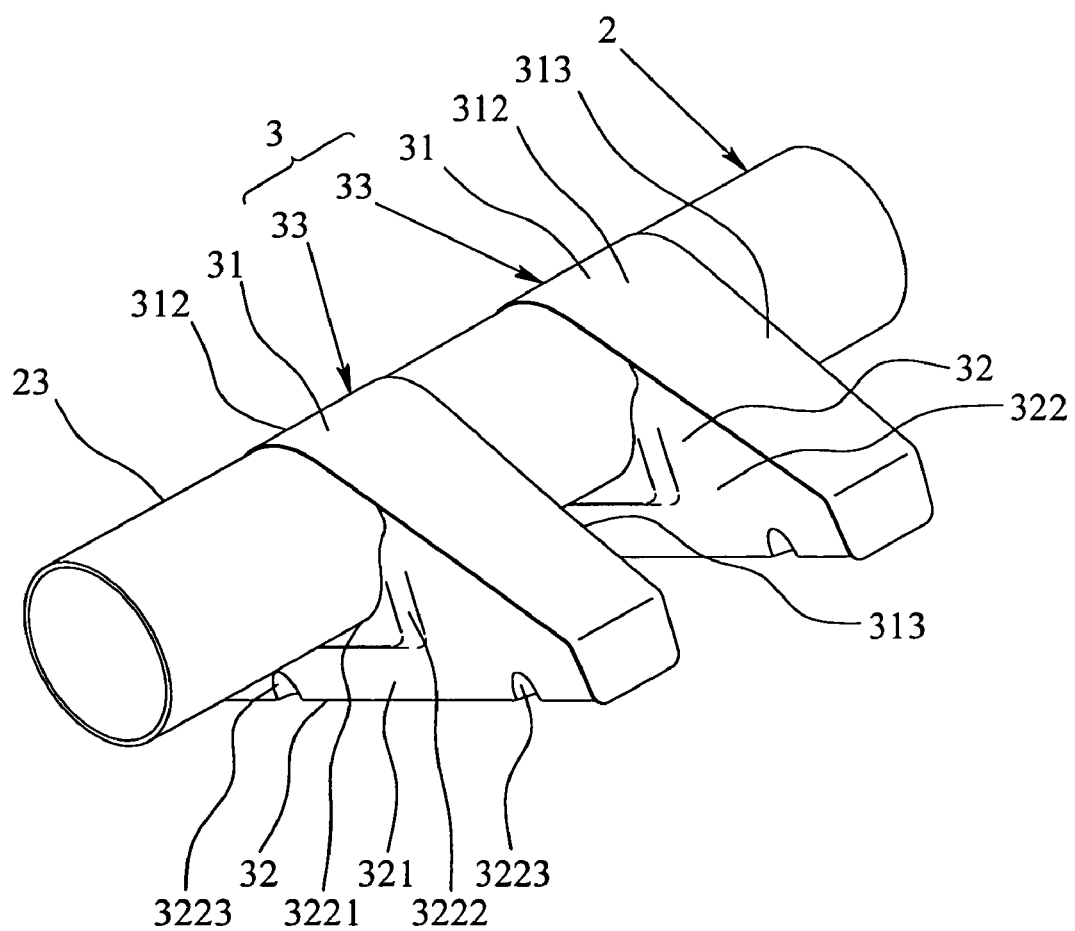
FIG. 7 is a perspective view corresponding to FIG. 2 and showing a steering column bracket mounted to the deck cross member as an alternative example.

FIG. 7 is a perspective view corresponding to FIG. 2 showing a steering column bracket 3 as an alternative example mounted to the deck cross member 2. The steering column bracket 3 of the present invention improves its structural strength by that a pair of the bracket units 33, 33 each comprising a receiving main body 32 and a sling plate 31, which are welded not only to each other but also to the deck cross member 2, forms a closed section structure. The sling plate 31 is formed of one metal plate. As described above, by aligning directions in which the load is transmitted with extending directions of the front part face and the rear part face 313 extending from the intermediate part face 312, i.e., the directions of tangents to the deck cross member 2, deformation of the member is suppressed or prevented. The rigidity of the mounting plate portion 321 which is the bottom face of the receiving main body 32 having groove shape can be improved by narrowing the width thereof. As a result, the groove shape of the receiving main body 32 becomes flared upwardly in that the abutting plate portions 322, 322 that form both side faces of the receiving main body 32 are extending while broadening. Further, the abutting plate portions 322, 322 of the receiving main body 32 individually comprises a reinforcing portion 3222, attaining to the notch edge 3221, formed by bulging a shape in a plan view of the notch edge 3221 having curvature in a direction orthogonal to the abutting plate portion 322 as shown in FIG. 7. Moreover, partial recessed portions 3223 are formed at bent edges between the abutting plate portions 322 and the mounting plate portion 321. This further improves rigidity of the receiving main body 32. It may be alternatively adopted the shape and directions bulging or recessed in which the reinforcing portion 3222 is set, and, the shape, size and number in which the recessed portion 3223 is set, according to size or the whole shape of the actual steering column bracket 3.

What is claimed is:

1. A steering column bracket for supporting a steering column on a deck cross member spanned across a vehicle body frame in a width direction of the vehicle body, secured to the deck cross member to function as a mounting base portion for the steering column, the steering column bracket comprising a receiving main body put to the deck cross member from below, a sling plate straddling the deck cross member from above to be spanned over the receiving main body, the receiving main body is formed into a sectionally groove shape by integrally coupling respective lower edges of a symmetric pair of abutting plate portions and corresponding opposite ends of a mounting plate portion, the mounting plate portion provides a mounting portion for the steering column, each of the abutting plate portions is formed in a shape of twin peaks that comprises a notch edge located between the twin peaks and shaped along a sectional shape of the deck cross member, a front inclined edge and a rear inclined edge aligning with tangents to the deck cross member, both the notch edges are put and welded to the deck cross member from below, the sling plate has an intermediate part face brought in contact with the deck cross member from above, and a front part face and a rear part face protruding from the deck cross member to align with the tangents to the deck cross member, the front inclined edges and the rear inclined edges of both the abutting plate portions of the receiving main body aligning with the tangents to the deck cross member being respectively brought in contact with the front part face and the rear part face from below, side edges of the intermediate part face of the sling plate are welded to the deck cross member, and the front inclined edges and the rear inclined edges of the receiving main body are respectively welded to the front part face and the rear part face of the sling plate.

2. The steering column bracket according to claim 1, wherein the steering column bracket has a two-member structure each defined by the receiving main body and the sling plate as a bracket unit comprising the mounting portion formed on the mounting plate portion of the receiving main body for supporting either side of the steering column, and arranging in pairs to the deck cross member.

3. The steering column bracket according to claim 1, wherein the receiving main body is formed with a reinforcing portion bulging or recessed in a direction orthogonal to the abutting plate portion, the reinforcing portion reaches the notch edge, and the notch edge is molded in the shape of curvature in a plan view.

4. A steering column bracket according to claim 1, wherein the receiving main body is formed with a recessed portion partially at a bent edge molded between the abutting plate portion and the mounting plate portion.

5. A steering column bracket according to claim 1, wherein each of the abutting plate portions is formed with a front end edge intersecting the front inclined edge and extending from an end of the front inclined edge down toward the mounting plate portion, the front part face of the sling plate is partially bent toward the front end edges, and the front end edges are brought in contact with and welded to the front part face partially bent.

6. A steering column bracket according to claim 1, wherein the abutting plate portions is formed with a rear end edge intersecting the rear inclined edge and extending from an end of the rear inclined edge down toward the mounting plate portion, the rear part face of the sling plate is partially bent toward the rear end edges, and the rear end edges are brought in contact with and welded to the rear part face partially bent.

* * * * *